United States Patent [19]

Travaglini

[11] 4,312,630
[45] Jan. 26, 1982

[54] HEATERLESS HOT NOZZLE

[76] Inventor: Nicola Travaglini, 51 Harris Crescent, Woodbridge, Canada

[21] Appl. No.: 131,510

[22] Filed: Mar. 18, 1980

[51] Int. Cl.³ .................................................. B29F 1/03
[52] U.S. Cl. .................................... 425/568; 425/191; 425/549; 425/570
[58] Field of Search ................. 425/549, 568, 570, 191

[56] References Cited

U.S. PATENT DOCUMENTS

| | | | |
|---|---|---|---|
| 2,529,146 | 11/1950 | Feitl | 425/191 |
| 3,281,898 | 11/1966 | Compton | 425/568 X |
| 4,010,903 | 3/1977 | Sakuri | 425/549 X |
| 4,212,625 | 7/1980 | Shutt | 425/549 |

FOREIGN PATENT DOCUMENTS 634853 3/1950 United Kingdom .............. 425/568

Primary Examiner—Thomas P. Pavelko
Attorney, Agent, or Firm—George A. Rolston; William F. Frank

[57] ABSTRACT

A nozzle apparatus for use in an injection mold comprising a relatively massive body, having a central passageway extending axially therethrough, and a counterbore connecting therewith, having threads formed therein, and having a nozzle tip member, having threads at one end whereby the same may be threaded into said counterbore, and having a central passageway communicating with the central passageway in the body portion, and having at least one opening at its other end, for ejection of plastic therefrom, said body and said nozzle tip member being formed of a good heat conductive material, and a housing shell adapted to fit around said body portion and at least a portion of said nozzle tip member, and, support means formed integrally with said housing, for supporting said housing and said main body portion and said nozzle tip member therein in position.

10 Claims, 3 Drawing Figures

U.S. Patent
Jan. 26, 1982
4,312,630
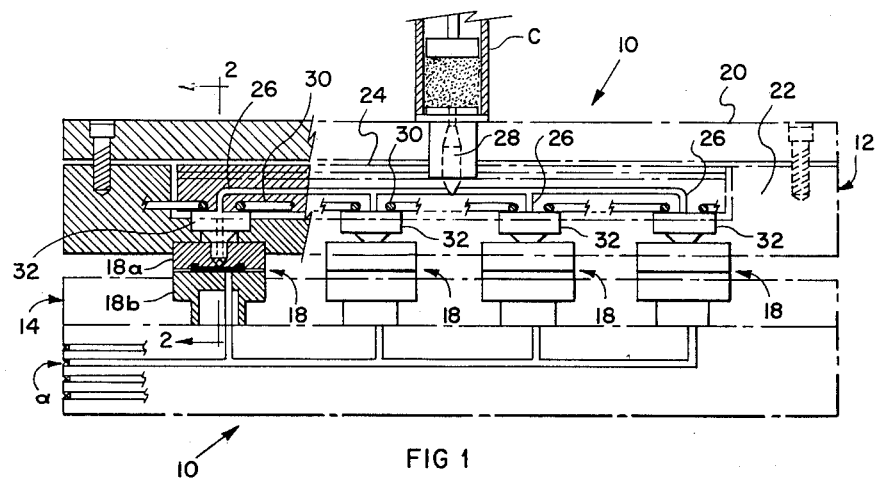
FIG 1
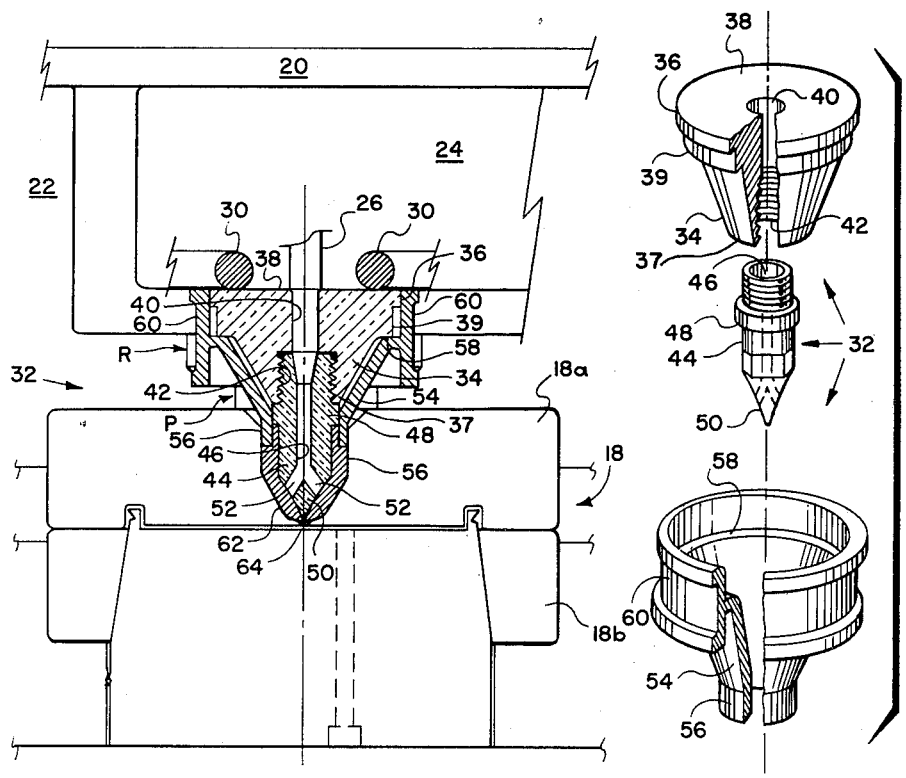
FIG 2
FIG 3

HEATERLESS HOT NOZZLE

The invention relates to injection molds for forming thermoplastic articles, and in particular, to the construction of the injection nozzles used in such molds.

BACKGROUND OF THE INVENTION

In the construction of multi-cavity injection molds, each mold is provided with an injection nozzle, through which hot liquid plastic is injected into the mold. The injection nozzles are mounted in a relatively massive steel block known as the backing plate or base plate, and this block is in turn attached to a face plate in the injection molding machine.

Hot liquid plastic is forced through a network of connecting passageways or manifolds, by means of the injection cylinder in the injection molding machine, and eventually reaches the injection nozzles for the individual molds or cavities.

It is of course essential that the plastic shall remain as far as possible at the original temperature at which it leaves the injection cylinder, so that it remains in a molten flowable state when it is injected into the cavity. If there is a substantial temperature drop, by the time the plastic reaches the cavity, then the cavity may not be completely filled, resulting in wasteful rejects. In extreme cases the plastic may in fact freeze or set hard in the nozzle, leading to costly machine down time while the nozzle is removed and cleared.

The problem of temperature drop in the injected plastic is of course created largely by the very size of the molds themselves. The large masses of steel used to fabricate the molds, constitutes a highly efficient heat sink, and heat is readily transferred from the hot plastic into the steel blocks from which the molds are built. In order to overcome this, it has been standard practice for many years to incorporate electrical heating elements throughout the construction of the mold, and in fact the mold may be subjected to a fairly lengthy pre-heating process by means of these heating elements, before any attempt is made to start up the actual injection of plastic.

However, the heating of the molds by means of such electrical heating elements itself creates further problems. If the mold is maintained at too high a temperature, then the individual cavities may not be cool enough to produce a rapid freezing of the plastic as soon as the cavity is filled. Consequently, the cycling time for that particular mold may be too slow for efficient production, and consequently, while it is clearly desirable to maintain the main body of the mold throughout which the hot plastic is carried in passageways, within reason as hot as possible, it is also desirable to maintain the individual cavities at a much lower temperature.

For this reason, in the construction of such molds, it is customary to provide a two-part construction on the injection side of the mold, with one part or backing plate, incorporating the manifold system throughout which the hot plastic is carried to the individual nozzles, and another part or cavity support plate supporting the individual cavities, each of which is supplied by an individual nozzle. Even using this procedure, it is desirable to ensure that the nozzle while being hot enough to avoid an undesirable temperature drop in the liquid plastic, shall not be of such a nature that it conducts significant heat to the cavity to which it is connected.

BRIEF SUMMARY OF THE INVENTION

With a view to overcoming these disadvantages, and to satisfy as far as possible the various conflicting objectives, the invention provides a nozzle apparatus for use in an injection mold comprising a relatively massive body, having a central passageway extending axially therethrough, and a counterbore connecting therewith, having threads formed therein, and having a nozzle tip member, having threads at one end whereby the same may be threaded into said counterbore, and having a central passageway communicating with the central passageway in the body portion, and having at least one opening at its other end, for ejection of plastic therefrom, said body and said nozzle tip member being formed of a good heat conductive material, and a housing shell adapted to fit around said body portion and at least a portion of said nozzle tip member, and, support means formed integrally with said housing, for supporting said housing and said main body portion and said nozzle tip member therein in position.

It is a further objective of the invention to provide a nozzle having the foregoing advantages wherein there is defined an air gap between at least part of said body portion and said shell housing, to restrict heat transfer from said base portion to said shell housing.

It is a further and related objective of the invention to provide a nozzle having the foregoing advantages incorporating a liquid tight seal between a portion of said housing and said nozzle tip member, whereby to restrict and prevent flow of liquid plastic from said nozzle tip member into said housing.

It is a further and related objective of the invention to provide a nozzle having the foregoing advantages wherein the body portion is of generally frustoconical shape, and having a generally cylindrical rim extending therearound, and wherein said housing is of generally frustoconical shape, and incorporating a generally cylindrical support member formed integrally therewith, and a bearing portion adapted to engage said generally cylindrical rim, whereby to hold said body portion securely in position preferably, in the manifold block portion on which the nozzle is mounted, will be an axial passageway in communication with the the axial passageway in the body portion, for permitting flow of liquid plastic therethrough, and there will further be an electrical heating element in said manifold block around said passageway, in contact with a portion of said body portion, whereby electrical heat may be supplied directly to said body portion and hence conducted to said nozzle tip member, without the use of separate individual heater bands on the nozzle tip member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

In the drawings:

FIG. 1 is a schematic top plan view, partially in section, of a typical multi-cavity injection mold, incorporating the invention;

FIG. 2 is a greatly enlarged section of the nozzle according to the invention shown along the line 2—2 of FIG. 1, and, FIG. 3 is an exploded perspective illustration, partially cut away, of the nozzle shown in FIG. 2.

DESCRIPTION OF A SPECIFIC EMBODIMENT

As shown in FIG. 1, an injection mold is shown generally as 10, comprising an injection mold portion 12, which is normally fixed and does not move, and a moveable mold portion 14.

Normally the fixed portion 12 of the mold 10 will be mounted on a fixed bed plate or platen (not shown) of the injection molding machine (not shown). The moveable mold portion 14 will normally be mounted on a moveable platen (not shown) of the injection molding machine, on which it may be moved towards and away from the fixed mold portion 12.

It will of course be appreciated that the details of the various platens, and the construction of the injection molding machine do not form part of the invention, and may vary widely from one injection molding machine to another.

The mold 10 may comprise a plurality of separate mold cavities indicated generally as 18, each cavity 18 being defined by fixed cavity portions 18a and moveable cavity portions 18b. The fixed cavity portions 18a are fastened in the fixed mold portion 12 and the moveable cavity portions 18b are mounted in the moveable mold portion 14. In accordance with well-known practice, they are machined so as to define an interior shape to mold any desired component or article. The details of such cavity portions are well known in the art, and require no further description.

Fixed mold portion 12 comprises a back plate 20 and a front plate 22, which enclose and support a manifold block 24. This type of construction is widespread in the mold making art. Front plate 22 is relatively thick, and will have a recess within which the manifold block is enclosed. The fixed cavity portions 18a are bolted or clamped to the front of front plate 22 in known manner.

Manifold block 24 contains a series of transverse and axial drillings or passageways 26 for carrying the molten plastic material from the injection molding machine to the cavities 18.

The manifold block 24 is itself supplied through supply conduit 28, with hot liquid plastic material, from any suitable pressure source indicated generally as the cylinder C. Cylinder C is shown schematically, and again may vary widely depending upon the design of the injection molding machine. It will of course be heated in any known manner, whereby to heat the plastic material to the molten liquid state so that it may be injected into the cavities.

The design of the cylinder C and its details, of course, form no part of the invention.

The manifold block 24 is also provided with a plurality of electrical heating elements shown as 30 which are located in suitable channels or passageways formed in the block 24, and may be supplied with electrical power through any suitable connection means (not shown) whereby the block 24 may be heated.

The nozzles according to the invention are shown in more detail in FIGS. 2 and 3.

There is one such nozzle 32 for each cavity, and it connects with a respective passageway 26 in block 24 whereby to receive hot liquid plastic material therefrom and transport the same to the fixed mold portion 18a. The nozzle 32 will be seen to comprise heat conductive body portion 34 of generally frustoconical shape, and having a mounting rim 36 of generally cylindrical shape therearound, defining a rear flat base 38 for contacting the manifold block 24 around the passageway 26, and for also contacting the electrical conductors 30 mounted in block 24 and having a forward end 37.

Rim 36 is stepped to define a reduced diameter shoulder 39 for purposes to be described below.

The body 34 is provided with a central axial bore 40 communicating with the passageway 26, and an enlarged internally threaded counterbore 42 communicating therewith.

Received within the counterbore 42, and extending therefrom is the nozzle tip member 44, provided with suitable threads for mating with the threads 42, and having a central bore 46 registering with the bore 40 in the base 34.

A sealing rim or shoulder 48 is provided on the exterior of nozzle member 44, and its free end forms a generally tapering conical point 50. A pair of ejection openings 52 connect with the bore 56, through which hot liquid plastic material may be ejected.

Both the body 34 and the nozzle member 44 are made of a good heat conducting material, preferably a copper alloy material such a beryllium copper, having sufficient hardness to withstand the usage to which it will be subjected and a high heat conductivity.

In order to enclose and support and insulate body 34 and nozzle tip 44, an insulating housing shell 54 is provided of generally frusto-conical shape, having a forwardly extending cylindrical sealing neck 56, making a good pressure fit with the rim 48 on the nozzle 44.

An air gap is formed between the main body 34 and the housing shell 54, whereby to provide a degree of thermal insulation around body 34.

A generally annular mounting flange 58 is provided at the wide end of housing shell 54, which is adapted to bear on the shoulder 39 of the body 34. A generally cylindrical mounting sleeve 60 is formed integrally with the flange 58, and fits snugly around the rim 36 while defining an air gap around shoulder 39. Sleeve 60 extends forwardly around but spaced from the housing shell 54.

Sleeve 60 at its rear end is co-planar with rear surface 38 of body 34, and in this way surface 38 can be held firmly in heat exchange contact with manifold 24, and heaters 30. Body 34 can thus be maintained at an adequate temperature without the use of individual heater elements.

Shell 54, flange 58 and cylndrical sleeve 60 are all formed integrally of steel or a material of equal or greater strength, having a very low heat conductivity and capable of withstanding much higher clamping pressures.

In this way, the entire nozzle assembly 32 may be installed in position and clamped tightly between front plate 22 and back plate 20 so as to provide adequate liquid-tight seals where necessary, without damaging or distorting the relatively softer material of the body portion 34 and nozzle tip 44.

In order to receive the nozzle tip 44, an open ended recess or well 62 is formed in the fixed die portion 18a of the die 18, and machined to dimensions such that it makes a good liquid-tight seal with the exterior of the sealing neck 56 of the housing 54, and defining a substantial free space around the pointed end 50 of the nozzle tip 44.

A small entry opening or so-called "gate" 64 is provided connecting the well 62 with the interior or "cavity" of the die 18.

In operation, hot liquid plastic contained within cylinder c is forced, by the operation of a piston within cylinder c through supply passage 28 into manifold plate 24, where it flows along passageways 26. Manifold plate 24 is heated, by means of the electrical conductors 30, to a sufficient temperature to maintain such plastic in a liquid flowable state while in the passages 26.

The plastic will then flow from respective passageways 26 into bores 40 in each of the body portions 34 of each of the nozzles 32. Body portions 32, being in contact, through their base surfaces 38 with the electrical conductors 30, are also maintained at sufficient temperature to ensure that the liquid plastic material remains in a flowable state. The air spaces provided around the bodies 34, enclosed by means of the housings 54, and 60, substantially reduce the rate of heat loss from the bodies 34, so that it is possible for the electrical conductors 30 to maintain such bodies 34 at a sufficiently high temperature, without each of the bodies 34 being provided with individual separate heating bands as was the custom in the past.

The plastics material will then flow through the bores 46 and openings 52 into the well 62, and from there into the cavity of the mold 18 for forming the article. Compressed air is typically used to release the article from mold 18b. It may be supplied through airways a.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. An injection nozzle apparatus for use with a die cavity in a mold assembly and which nozzle assembly comprises:
    a relatively massive body having a base surface and a forward end and having a high heat conductivity;
    shoulder means on said body for mounting thereof in said mold assembly;
    a passageway extending through said body from said base surface to said forward end;
    threaded attachment means at said forward end around said passageway
    a nozzle tip member threadedly secured to said body at said threaded attachment means and having a passageway therethrough communicating with said passageway in said body at least one opening for the ejection of molten plastics material therefrom;
    an outer shell partially enclosing said body and exposing said base surface and at least partially encircling said nozzle tip member;
    flange means on said shell adapted to engage said shoulder means on said body, said shell being adapted to be secured on such a mold assembly to hold said body in position thereon with said base in heat exchange relation with said mold assembly for the flow of molten pastics material from such assembly, through said nozzle tip member and into a die cavity, and wherein said outer shell is formed of a material having a lower thermal conductivity than that from which said body is formed and,
    support means formed integrally with said outer shell for supporting said nozzle tip member.

2. An injection nozzle assembly as claimed in claim 1 and in which said nozzle tip member is formed from the same material as said relatively massive body portion.

3. An injection nozzle assembly as claimed in claim 2 in which said relatively massive body portion and said nozzle tip member are both formed of a copper alloy having a relatively high thermal conductivity and in which said outer shell is formed of steel.

4. An injection nozzle assembly as claimed in claim 1 in which there is provided a partial spacing between said body and said outer shell which spacing is closed to prevent the passage of molten plastics material thereinto, thereby establishing a closed air space which serves to reduce the transfer of heat from said body to said shell.

5. An injection nozzle assembly as claimed in claim 1 and in which said outer shell comprises a generally cylindrical skirt encircling said nozzle tip member with said nozzle tip member projecting forwardly from said skirt and sealingly engaging said nozzle tip member rearwardly of a forward end of said skirt to define a forwardly open annular space between said skirt and said nozzle tip member for the flow into such space during use of molten plastics material.

6. An injection nozzle assembly as claimed in claim 1, in which said body comprises a generally frusto-conical portion and a generally cylindrical rear rim portion and a forwardly facing, stepped annular shoulder, and in which said outer shell comprises a rear, generally cylindrical portion, an intermediate generally frusto-conical portion and a front generally cylindrical portion, defining between said rear and intermediate portions a rearwardly facing internal annular flange adapted to engage said stepped annular shoulder of said body.

7. An injection nozzle assembly as claimed in claim 6 and in which said nozzle tip member is removably screwed into said body.

8. An injection nozzle assembly as claimed in claim 6 and in which said nozzle tip member projects forwardly from said front generally cylindrical portion of said shell.

9. An injection nozzle assembly as claimed in claim 6 and in which said body and said shell are dimensioned so as to provide a sealed space between said generally frustoconical portions of said body and said shell.

10. An injection nozzle assembly as claimed in claim 6 and in which said nozzle tip member comprises an outwardly projecting annular collar sealingly engaging said front generally cylindrical portion of said shell rearwardly of a forward end of that shell.

* * * * *